Jan. 13, 1970     T. E. LAUGHLIN     3,488,879
COMBINED POISON BAIT STATION AND GARBAGE CAN SUPPORT
Filed April 29, 1968
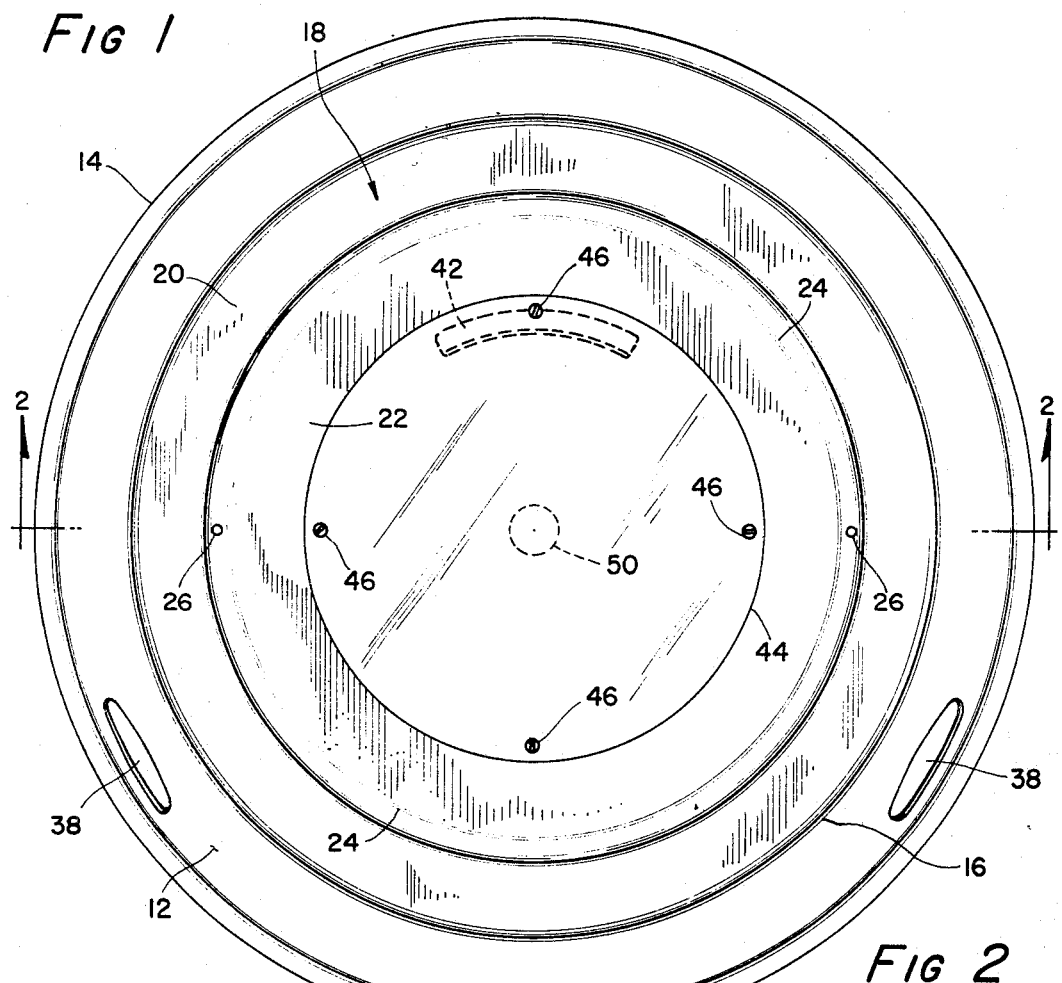
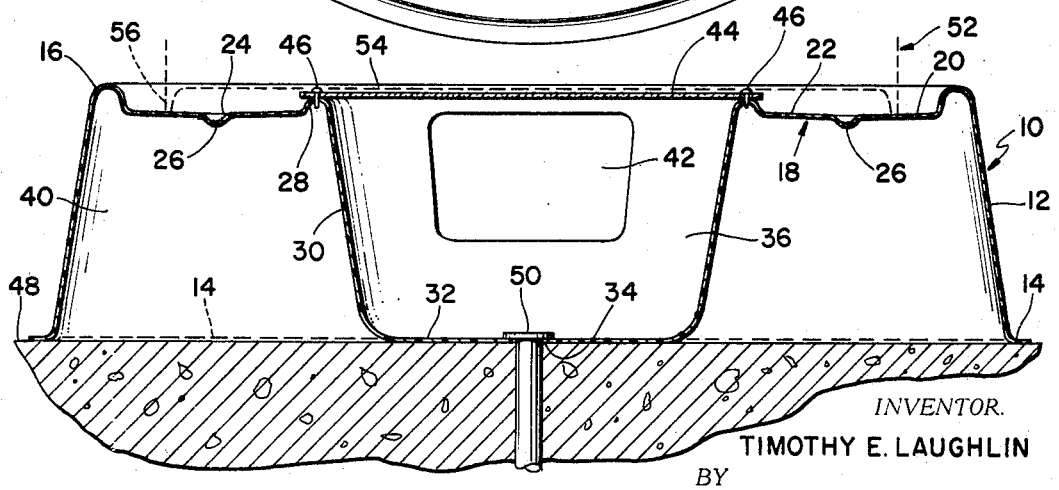
INVENTOR.
TIMOTHY E. LAUGHLIN
BY
Dugger, Peterson, Johnson & Westman
Attorneys

United States Patent Office 3,488,879
Patented Jan. 13, 1970

3,488,879
COMBINED POISON BAIT STATION AND
GARBAGE CAN SUPPORT
Timothy E. Laughlin, 11801 Ridgemount Ave.,
Minnetonka, Minn. 55343
Filed Apr. 29, 1968, Ser. No. 724,814
Int. Cl. A01m 1/20, 25/00
U.S. Cl. 43—131     10 Claims

ABSTRACT OF THE DISCLOSURE

Outer and inner concentrically spaced walls have a recessed annular platform extending between the upper edges thereof to provide a support for a conventional garbage can and to form a passageway beneath the platform and between the walls into which the rodent first enters. The inner wall and its bottom form a receptacle in which poisoned bait is placed, an opening allowing access to the bait from the passageway. A centrally disposed hole in the bottom of the receptacle allows the entire structure to be firmly anchored by means of a rod or spike.

BACKGROUND OF THE INVENTION

Field of the invention

This invention relates generally to bait stations, and pertains more particularly to a combined poison bait station and garbage can support.

Description of the prior art

Poisoned bait boxes or stations, of course, have been used heretofore. Such devices have not been suitable for supporting a garbage can and those known to me where they have been at all effective have been fairly complex and costly to manufacture. Also, devices for trapping rodents are known and at least two of these traps have had garbage cans associated therewith. One such trap is illustrated in U.S. Patent No. 1,223,525 granted on Apr. 24, 1917 to Harry Schullman and the other in U.S. Patent No. 1,955,496 granted on Apr. 17, 1934 to Parley F. Harris. However, both devices are quite massive and complicated. Furthermore, since these two specific prior art constructions deal with the trapping of the rodent, the trap details by necessity result in an entirely different structure from that envisioned by the present invention.

SUMMARY OF THE INVENTION

An important object of the present invention is to provide a simple stand or holder that functions as a poison bait station and also allows a conventional garbage can to be supported thereon, even though the device is fabricated from relatively thin sheet material.

Another object of the invention is to provide a combined poison bait station and garbage can support that will allow the garbage can and its contents to first attract the rodent to the vicinity and thereafter serve as an inducement to the rodent to enter the structure.

Another object of the invention is to provide a simple means for supporting the garbage can with the assurance that it will not slip off.

Still another object of the invention is to provide a ready means for anchoring the support structure to the ground so that it cannot be picked up and played with by children.

A still further object is to prevent children and domestic animals from reaching the poisoned food because of a rather tortuous path that the rodent must traverse.

Yet another object of the invention is to provide a combined poison bait station and garbage can support that will encourage rodents to enter into the interior thereof by reason of the fact that they are not compelled to walk on any smooth, slippery surface which they dislike and normally avoid.

A further object of the invention is to provide visual means by which the amount of poisoned food remaining in the receptacle can be visually checked by merely removing the garbage can, a transparent plate or cover allowing such inspection to be made.

The invention has for a further object the provision of drain holes in the top of the casing or housing so that water or ice will not accumulate. Actually, the invention has for a further aim the prolonging of the usable life of the garbage can due to the fact that its bottom is kept off the ground and maintained in a relatively dry condition to prevent rusting and also to prevent the can from freezing to the ground.

Further, an object is to accommodate garbage cans of various sizes, even a relatively large drum being capable of being adequately supported on my device.

Also, another object of the invention is to permit the nesting of a number of my devices together so as to make the shipping thereof comparatively easy and inexpensive. Therefore, the present invention involves the use of a relatively lightweight casing or housing that can easily be made from a suitable plastic or sheet metal and which can be manufactured quite inexpensively, thereby encouraging its widespread use.

BRIEF DESCRIPTION OF THE DRAWING

FIGURE 1 is a top plan view of my poison bait station and garbage can support without a garbage can, and FIGURE 2 is a sectional view taken in the direction of line 2—2 of FIGURE 1 with the lower portion of a garbage can appearing in phantom outline.

DESCRIPTION OF THE PREFERRED EMBODIMENT

Referring now in detail to the drawing, it will be observed that the combined poison bait station and garbage can support has been denoted generally by the reference numeral 10. As will be discerned from FIGURE 2, the support lends itself readily to being molded from a suitable plastic, although the device can be fabricated from sheet metal if desired, thereby providing a choice to the manufacturer.

The support 10 includes an outer wall 12 that is generally vertical but inclines inwardly somewhat toward its top edge and is formed with a horizontal bottom flange 14 at its bottom edge. At the upper edge of the outer wall 12 is a reversely turned rim or flange 16. The rim or flange 16 curves downwardly and is integral with an annular platform 18. The platform 18 includes sloping floor sections 20, 22 which incline toward each other at an angle of approximately 5° with the horizontal. Where the sections 20, 22 meet, there is an annular groove 24 having a pair of diametrically spaced drainage holes 26 formed therein so that water and ice will not collect.

The platform 18, more specifically the section 22 thereof, is integrally connected with an inner rim or flange 28 that is reversely turned in a fashion similar to that of the flange 16; however, it is to be noted that the flange 28 is at a slightly lower elevation than the flange 16 for a purpose hereinafter made manifest. The rim or flange 28 curves downwardly into an inner wall 30 that is concentrically spaced with respect to the outer wall 12. The inner wall 30 at its lower edge merges into a circular bottom panel 32 having an anchor hole 34 centrally located therein.

The inner wall 30 and the bottom panel 32 form a receptacle 36 for the accommodation of the poisoned food or bait, normally in pellet form. It will now be pointed out that two openings 38 are provided in the outer wall 12 so that the rat or mouse can enter therethrough into a passageway 40 formed beneath the platform 18 and between the outer wall 12 and the inner wall 30. Also, it will be observed that an access opening 42 is provided in the inner wall 30 so that the rodent once it has entered the passage 40 can get to the poisoned food in the receptacle 36. It is important to appreciate, though, that the single access opening 42 is angularly displaced or offset with respect to the entrance openings 38. Hence, the rodent must first enter the passage 40 through either of the openings 38 and then proceed to the opening 42. The offsetting of the entrance openings 38 with respect to the access opening 42 causes a segment of the wall 30 to act as a baffle which prevents children and domestic animals from reaching the food in the receptacle 36.

Also, a transparent disc or lid 44, preferably of acrylic plastic, covers the receptable 36, being attached by screws 46 extending into the inner rim or flange 28. In this way, visual inspection is afforded as to the amount of poisoned food remaining in the receptacle 36. The lid 44 safeguards the contents of the receptacle 36 from children who might remove the garbage can and pick up the food.

It will be discerned that the bottom horizontal flange 14 is coplanar with the bottom panel 32. Hence, my support 10 rests on a sizable area so that any load carried thereby is well distributed, thereby permitting the support to be fabricated from relatively thin stock, such as sheet metal or molded plastic. As illustrated, my support 10 may rest on a ground surface labeled 48. A portion of a relatively long rod or spike 50 projects downwardly through the hole 34 formed in the bottom panel 32 and thereby assures firm anchorage of the entire support 10. When the support 10 is to be used on a concrete surface (not shown), a Lewis bolt and embedded key piece may be employed.

Since it is intended that a garbage can will be supported on the device, a lower portion of such a can has been presented in phantom outline and has been assigned the reference numeral 52, the can 52 having a bottom 54 and the usual downwardly projecting flange or chime 56. It is important to appreciate that the annular platform 18 allows cans 52 of a variety of sizes to be supported on the platform. The flange or chime 56 resides between the two flanges 16 and 28, these flanges and platform forming a relatively wide trough. The flange 16, as readily perceived from FIGURE 2, is at a higher elevation than the flange 28, thereby preventing the garbage can 52 from sliding off.

With the foregoing information in mind, the use of my invention should be readily comprehended. It will be appreciated, though, that the rod or spike 50 is first driven downwardly through the anchor hole 34 so as to hold down the entire support 10. Having done this, the support 10 is in readiness for receipt of the poisoned food. The food is placed in the receptacle 36 and then the lid 44 is secured in place through the agency of the screws 46. This is all that need be done in preparation for using the device, for the garbage can 52 is then rested on the platform 18 between the flanges 16 and 28.

When a rodent is attracted to the vicinity of the garbage can 52 by virtue of the odors emanating therefrom, the rat or mouse is then encouraged to go into either of the two entrance openings 38, especially since the surface 48 provides the bottom for the passageway 40 and need not differ from the surface the animal has ventured on to reach my support 10. Once inside, the rodent travels through the passageway 40 to the access opening 42 where it can obtain the poisoned bait; at no time does the rodent have to walk upon a smooth or slippery surface to reach the bait. The poisoned food is of such a character that the animal is not immediately poisoned but leaves the support and goes to some remote point where it expires. The transparency of the lid 44 allows the amount of food remaining to be quickly noted by merely lifting the can 52 and replenished when necessary.

The trough formed by the flanges 16, 28 and the platform 18 allows any moisture to collect therein and since the platform 18 is composed of sloping floor sections 20, 22 such moisture will immediately drain toward the groove 24 where it gravitationally flows through the various holes 26. Thus, the amount of moisture collected never reaches such proportions that it will result in corrosion of the garbage can 52 and the moisture can drain before any freezing thereof would make the garbage can 52 difficult to remove.

It will be appreciated that any number of my supports 10 can be nested together to facilitate shipping. The lids 44, quite obviously, would be packed separately and later attached by the screws 46. The particular type of screw 46 will depend largely on the material to be used in making the support. Also, the head of the screw should be such that removal is discouraged, except by means of an appropriate tool not normally available to children.

Of primary impotrance, however, is the fact that even when constructed of thin stock, my support 10 is capable of withstanding a considerable load. It will be recognized that garbage cans, when full, can be quite heavy. Yet my combined poison bait station and garbage can support 10 is able to carry such loads without difficulty.

I claim:

1. A combined poison bait station and garbage can support comprising outer and inner walls, a platform extending between said walls adjacent the upper edges thereof to form a passageway therebeneath residing between said walls, means adjacent the outer periphery of said platform for accommodating inwardly thereof a garbage can, said means resisting lateral displacement of said can so that the can will continue to rest on said platform when placed thereupon, a bottom panel integral with the lower edge of said inner wall, said bottom panel being substantially coplanar with the lower edge of said outer wall and forming with said inner wall a receptacle for containing poisoned bait, said outer wall having an opening via which a rodent can enter said passageway and said inner wall having an opening via which said rodent can gain access to said bait.

2. A support in accordance with claim 1 in which said walls are concentrically spaced and said platform is annular, said walls, platform and bottom panel being of one-piece sheet stock with no stock being present between the lower edges of said outer and inner walls so that the rodent traverses the surface on which the support is placed when moving through said passage.

3. A support in accordance with claim 2 in which said openings are angularly offset with respect to each other.

4. A support in accordance with claim 2 including a reversely turned rim connecting said inner wall to said platform, and a flat disc detachably secured to said rim for closing the top of said receptacle.

5. A combined poison bait station and garbage can support comprising outer and inner concentrically spaced walls, an annular platform extending between said walls adjacent the upper edges thereof to form a passageway therebeneath residing between said walls, a reversely turned rim connecting said inner wall to said platform, a second reversely turned rim connecting said outer wall to said platform, said rims and platform forming a trough for accommodating the bottom flange of the garbage can to be supported, a bottom panel integral with the lower edge of said inner wall, said bottom panel being substantially coplanar with the lower edge of said outer wall and forming with said inner wall a receptacle for containing poisoned bait, and a flat disc detachably secured to said first-mentioned rim for closing the top of said receptacle, said outer wall having an opening via which a rodent can enter said passageway and said inner wall having an opening angularly offset with respect to said first-mentioned opening via which said rodent can gain access to said bait.

6. A support in accordance with claim 5 in which said platform has a plurality of drainage holes extending therethrough.

7. A support in accordance with claim 6 in which said platform has annularly disposed groove intermediate said rims, said drainage holes being located in said groove.

8. A support in accordance with claim 1 in which said means adjacent the periphery of said platform includes a reversely turned rim connecting said outer wall to said platform and extending above said platform to resist lateral displacement of said can.

9. A support in accordance with claim 8 including a reversely turned rim connecting said inner wall to said platform and extending above said platform to form a trough between said rims for accommodating the bottom flange of the can to be supported.

10. A support in accordance with claim 9 in which said platform has a plurality of drainage holes extending therethrough.

References Cited
UNITED STATES PATENTS

| | | | |
|---|---|---|---|
| 225,624 | 3/1880 | McClain | 43—131 |
| 1,955,496 | 4/1934 | Harris | 43—120 X |
| 2,299,723 | 10/1942 | Allbright | 43—131 |
| 2,480,724 | 8/1949 | Feussner | 43—131 |

WARNER H. CAMP, Primary Examiner